(12) United States Patent
Chen et al.

(10) Patent No.: US 8,306,934 B2
(45) Date of Patent: Nov. 6, 2012

(54) DEMO VERIFICATION PROVISIONING

(75) Inventors: Danny Yen-Fu Chen, Austin, TX (US); Sarah Vijoya White Eagle, Austin, TX (US); Fabian F. Morgan, Austin, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 644 days.

(21) Appl. No.: 12/414,372

(22) Filed: Mar. 30, 2009

(65) Prior Publication Data

US 2010/0250478 A1    Sep. 30, 2010

(51) Int. Cl.
*G06F 17/00* (2006.01)
*G06N 5/00* (2006.01)
(52) U.S. Cl. ............... 706/45; 715/850; 703/22
(58) Field of Classification Search .......... 706/46
See application file for complete search history.

(56) References Cited

U.S. PATENT DOCUMENTS

2006/0105299 A1* 5/2006 Ferris et al. .................. 434/11
2009/0066692 A1   3/2009 Comair et al.
2009/0069081 A1* 3/2009 Thorner ....................... 463/30
2010/0147182 A1* 6/2010 Tamisier et al. .............. 104/178

OTHER PUBLICATIONS

Smith, Mike; "Nintendo Planning Friendlier Approach to Game Difficulty", Yahoo Games, http://videogames.yahoo.com/feature/nintendo-planning-friendlier-approach-to-game-difficulty/127861, 1 page—retrieved Mar. 18, 2009.
Camtasia Studio, TechSmith's Screen Recording Software, http://www.techsmith.com/camtasia.asp, 2 pages, retrieved Mar. 18, 2009.

* cited by examiner

*Primary Examiner* — Omar Fernandez Rivas
*Assistant Examiner* — Kalpana Bharadwaj
(74) *Attorney, Agent, or Firm* — Mark C. Vallone; Yudell Isidore Ng Russell PLLC

(57) ABSTRACT

A method, system, and computer program product for issuing an alert when a method of a live demonstration deviates from demonstration simulation actions. A computer receives a command to commence a demonstration simulation. During the demonstration simulation, capture logic of a computer is initialized. The capture logic records events of the demonstration simulation. When a live demonstration subsequently initiated, demonstration verification logic of the computer continually monitors, in real-time, events of the live demonstration and compares the events to the previously recorded events captured during the demonstration simulation. In response to detecting that a live demonstration has deviated from the recorded demonstration simulation method, the demonstration verification logic issues a non-invasive alert. The non-invasive alert may be issued using visual, audible, or vibration feedback cues in such manner that an audience observing the live demonstration is un-aware of the non-invasive alert.

18 Claims, 4 Drawing Sheets

DEMO VERIFICATION PROVISIONING

BACKGROUND OF THE INVENTION

1. Technical Field

The present invention relates in general to computers, and in particular to computer software demonstrations. Still more particularly, the present invention relates a system for issuing an alerting when the method of a live demonstration deviates from a method of a previous demonstration simulation.

2. Description of the Related Art

Frequently presenters such as sales persons, engineers, and trainers need to present live demos of software. However, errors such as typos or omissions during the demonstration may lead to presenter embarrassment, time waste, and loss of credibility. Such errors may also lead to problems in the later stages of a demonstration.

One common solution is to print steps on paper for a presenter to follow. This method may help to reduce omissions and typos by allowing the presenter to follow along with printed instructions but may not eliminate them completely. Additionally, a presenter may rely on printed instructions as a crutch, and as such, focus too much on the paper instructions, thus giving less attention to the audience.

A second common solution is to use pre-recorded demonstrations. However, pre-recorded demonstrations prevent a presenter from deviating from recorded tasks of the pre-recorded demonstration. Additionally, pre-recorded demonstrations may give the appearance that the technology on display is under-developed or that the presenter's knowledge is limited.

SUMMARY OF THE INVENTION

Disclosed is a method, system, and computer program product for issuing an alert when a method of a live demonstration deviates from demonstration simulation actions. A computer receives a command to commence a demonstration simulation. During the demonstration simulation, capture logic of a computer is initialized. The capture logic records events of the demonstration simulation. When a live demonstration subsequently initiated, demonstration verification logic of the computer continually monitors, in real-time, events of the live demonstration and compares the events to the previously recorded events captured during the demonstration simulation. In response to detecting that a live demonstration has deviated from the recorded demonstration simulation method, the demonstration verification logic issues a non-invasive alert. The non-invasive alert may be issued using visual, audible, or vibration feedback cues in such manner that an audience observing the live demonstration is un-aware of the non-invasive alert.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, will best be understood by reference to the following detailed descriptions of an illustrative embodiment when read in conjunction with the accompanying drawings, wherein:

DETAILED DESCRIPTION OF THE PREFERRED EMBODIMENT

The illustrative embodiments provide a method, system, and computer program product for generating an alert when a method of a live demo deviates from demo simulation actions, in accordance with one embodiment of the invention.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
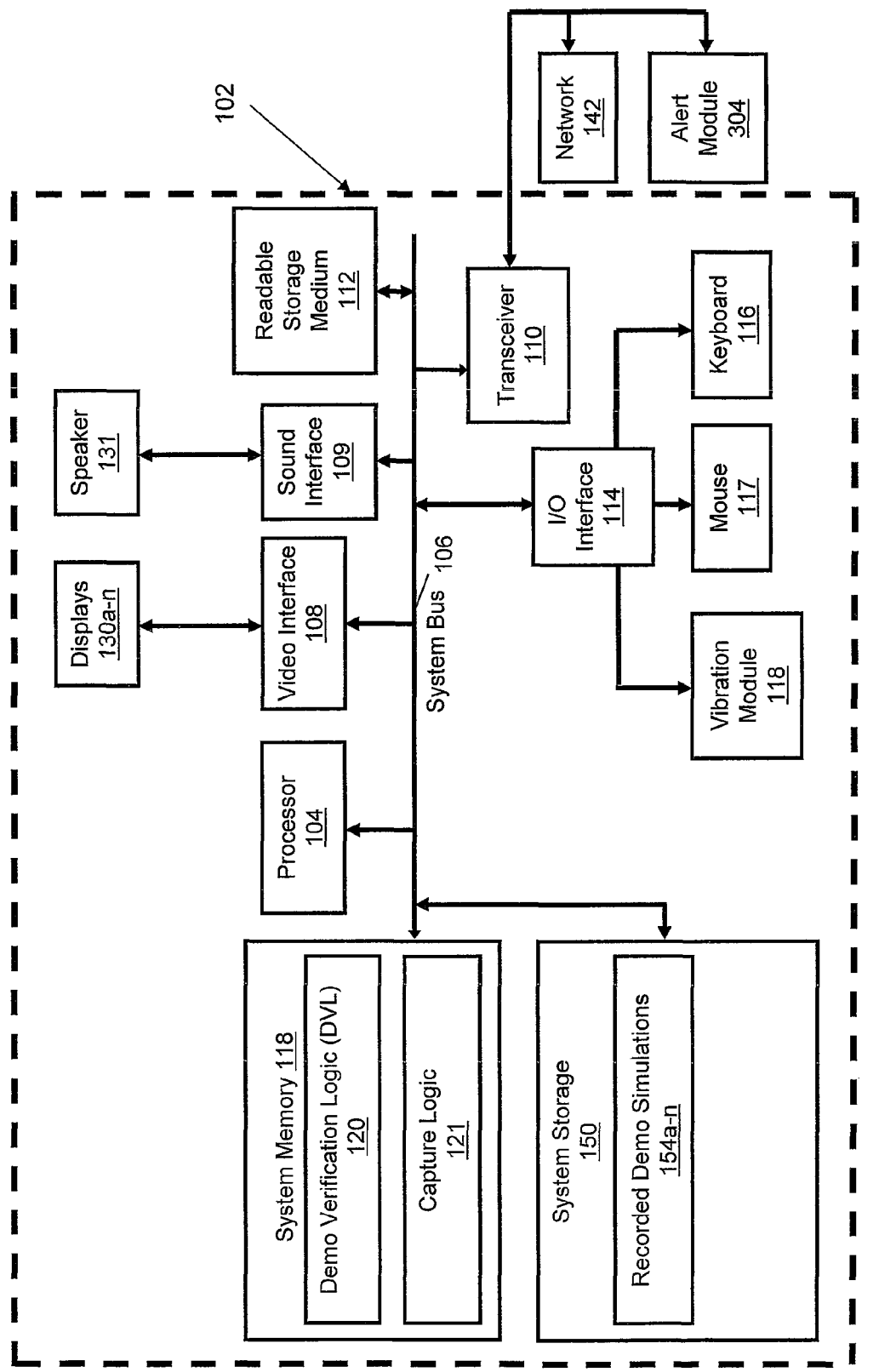
FIG. 1 is a block diagram of a computer in which the present invention may be implemented.

With reference now to FIG. 1, there is depicted a block diagram of a computer 102 in which the present invention may be implemented. Computer 102 includes a processor 104 that is coupled to a system bus 106. A transceiver 110, connected to system bus 106, enables computer 102 to connect to network 142 and alert module 304, via wired or wireless mechanisms. Video interface 108, coupled to system bus 106, allows for the connection of a displays 130a-n to computer 102 to enable the view of a general user interface (including text and graphics) for use by a user of computer 102. Audio interface 109, coupled to system bus 106, allows for the connection of a speaker 131 to computer 102, to enable the playback of audio alerts of computer 102. System bus 106 also affords communication with a hardware-based readable storage medium 112 (e.g., Compact Disk-Read Only Memory (CD-ROM), flash drive memory, etc). Input/Output (I/O) Interface 114, also connected to system bus 106, permits user interaction with computer 102, such as data entry via keyboard 116 or mouse 117, or vibration pulses via vibration module 118.

Computer 102 also comprises a system storage 150, which is connected to system bus 106. System Storage 124 comprises recorded demonstration simulations 154a-n.

Computer 102 also comprises system memory 118, which is connected to system bus 106. As shown, system memory 118 comprises demonstration verification logic (DVL) 120 for generating an alert when a method of a live demo deviates from demo simulation actions. DVL 120 includes code for implementing the processes described in FIGS. 2-4. In one embodiment, computer 102 is able to utilize DVL 120 to compare actions of a live demonstration against pre-recorded actions of a recorded demonstration simulation, as described in greater detail below in FIGS. 2-4.

As illustrated and described herein, computer 102 may be a computer or computing device having the required hardware components and programmed with DVL 120, executing on the processor to provide the functionality of the invention. The hardware elements depicted in computer 102 are not intended to be exhaustive, but rather are intended to highlight essential components required by and/or utilized to implement the present invention. For instance, computer 102 may include alternate memory storage devices such as magnetic cassettes, Digital Versatile Disks (DVDs), Bernoulli cartridges, and the like. These alternate configurations of components and other variations are intended to be within the spirit and scope of the present invention.

Figure 2:
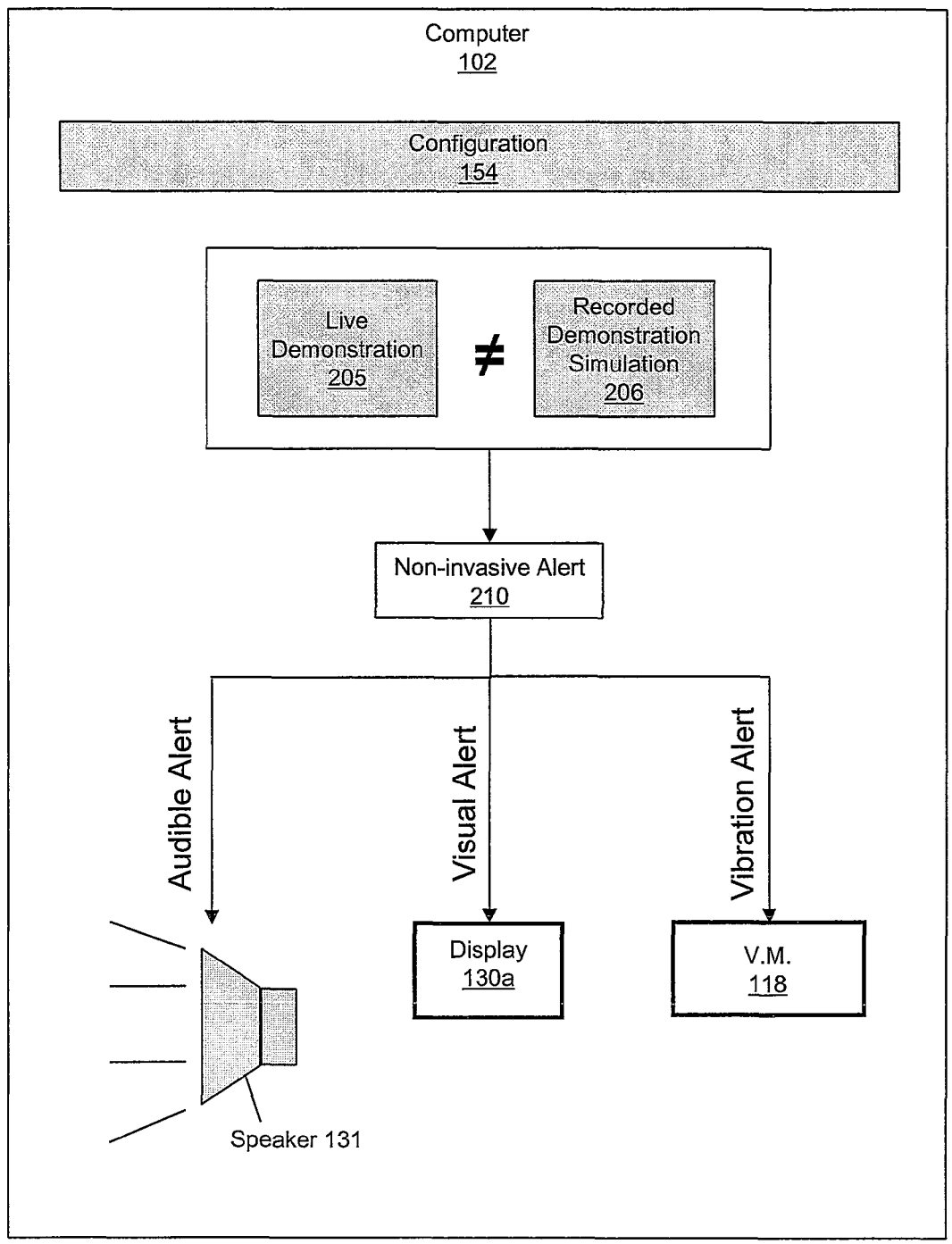
FIG. 2 is a block diagram of an exemplary system for generating an alert when a live demonstration deviates from actions of a recorded demonstration simulation, according to one embodiment.

With reference now to FIG. 2, there is illustrated an exemplary system for generating an alert when a method of a live demonstration deviates from recorded actions of a recorded demonstration simulation, in accordance with one embodiment of the invention. A recorded demonstration may be initialized in response to a presenter initiating the presentation recording by entering a specific keystroke command to record a number of events. The recorded demonstration simulation 206 contains an order of operations of events observed or performed during an original recording of a demonstration simulation. The events include, but are not limited to received input parameters, selected program settings, and running programs. Capture logic (e.g., capture logic 121) of computer 102 may capture other actions such as window focus, mouse position, window size, and keyboard or mouse events. After initialization of a demonstration simulation, capture logic 121 monitors the order of occurring events of the demonstration simulation. When the demonstration simulation is terminated, capture logic 121 records (to recorded demonstration simulation 206) the specific order and context of each action, each operation, and each setting performed of the demonstration simulation. During a live demonstration, computer 102 continually compares events (e.g. actions, operations, and settings) of the live demonstration against previously recorded events of a previously recorded demonstration simulation 206. A recorded demonstration simulation 206 is created prior to a live demonstration.

When a live demonstration is initialized, DVL 120 loads the recorded demonstration simulation 206a-n corresponding to the initialized live demonstration. A recorded demonstration may be initialized in response to a presenter pressing a specific button or by entering a specific keystroke command or chain of commands. DVL 120 continually monitors the order of events occurring during the live demonstration by monitoring actions such as window focus, mouse position, window size, and keyboard or mouse events. During a live demonstration, DVL 120 actively compares the order of events of the live demonstration with the order of events of the corresponding recorded demonstration simulation 206a-n to determine when the events of the live demonstration have deviated from the events of the demonstration simulation 206a-n. When DVL 120 determines that the order of events of the live demonstration have deviated from the order of events of recorded demonstration simulation 206, DVL 120 issues a non-invasive alert 210. When DVL 120 determines that a cause of the non-invasive alert has been resolved, the non-invasive alert may be cleared. In an alternate embodiment, DVL 120 may compare order of events of the live demonstration against a checkpoint determined in the demonstration simulation. In this embodiment only actions up to a checkpoint are compared, such that the presenter performs ten actions, for example, before the actions of the live demonstration are compared with a similar checkpoint in the demonstration simulation.

The non invasive alert 210 is a subtle alert to inform a user of computer 102 that a live demonstration has deviated from a recorded demonstration simulation 206. Non-invasive alert 210 may be any combination of a tactile pulse alert (e.g., a vibration), an audible alert, or a visual alert. A visual alert may be, for example, an on-screen indicator, an alert window, or a text message presented on a display (e.g., display 130a) of computer 102 viewable to the presenter. An audible alert be the playback of a pre-recorded sound recording or sound effect. In one embodiment the tactile pulse may be a specific pattern of pulses, similar to Morse Code, to indicate to a user the specific type of deviation from the recorded demonstration simulation 206a-n.

For example, in recorded demonstration simulation 206, after a test program was launched, computer 102 received keyboard instructions to maximize viewing area of the test program before receiving calculation data. However, during a subsequent live demonstration after launching the test program calculation data was received without previously receiving an instruction to maximize the viewing area of the test program. In response to detecting the above deviation from the recorded demonstration simulation 206, DVL 120, issues a non-invasive alert. In response to subsequently receiving an instruction to maximize the viewing area of the test program, DVL 120 may rescind or cancel the non-invasive alert.

In an additional embodiment a non-invasive alert could be integrated into a presentation tool such as Microsoft® NetMeeting®, such that the alerts would only be shown on the presenter's display and would not be viewable on displays viewed by attendees of the live demonstration. In this embodiment DVL 120 may also have the ability to show all the steps that need to be performed (e.g., next to fields, in content boxes), and as each action/step is taken, a particular help aid is removed from display.

Additionally, DVL 120 may also track and allow the presenter to observe or check an amount of time left in the live demo versus how many actions are left (based on what was recorded in the demonstration simulation). Accordingly, DVL 120 may use this information provide help text, suggestions to the presenter instructing the presenter to speed up or slow down as appropriate, in order to finish the live demonstration on time. For example, DVL 120 may suggest to the user: "You may not want to take any questions during the next 10 minutes, in order to complete on time" or "It took 15 minutes in the simulation to complete the remaining actions, but you have 10 minutes left, so please increase your speed". In the current embodiment any help text could be configured to display based on different factors such as: the amount of time expired in a live demonstration, determining the presenter has performed a specific action (e.g., Switching application focus), or by navigating to a particular screen or URL in the user interface. Furthermore non-invasive alerts and help text may be presented as an overlay to the user interface or may be presented adjacently to the user interface. In the same vein, the user may have recorded a number of optional scenarios in the demo simulation phase. In this manner, during the live demo, based on the time remaining, the invention can suggest which of the optional scenarios to show or exclude.

In an additional embodiment still, when applied to a gaming platform or gaming software, the invention may also incorporate social networking aspects, such as a friends list or social networking software website. In this embodiment a user may also choose a friend's simulation to view, in order to receive assistance in completing a particular level or task in a game.

Figure 3:
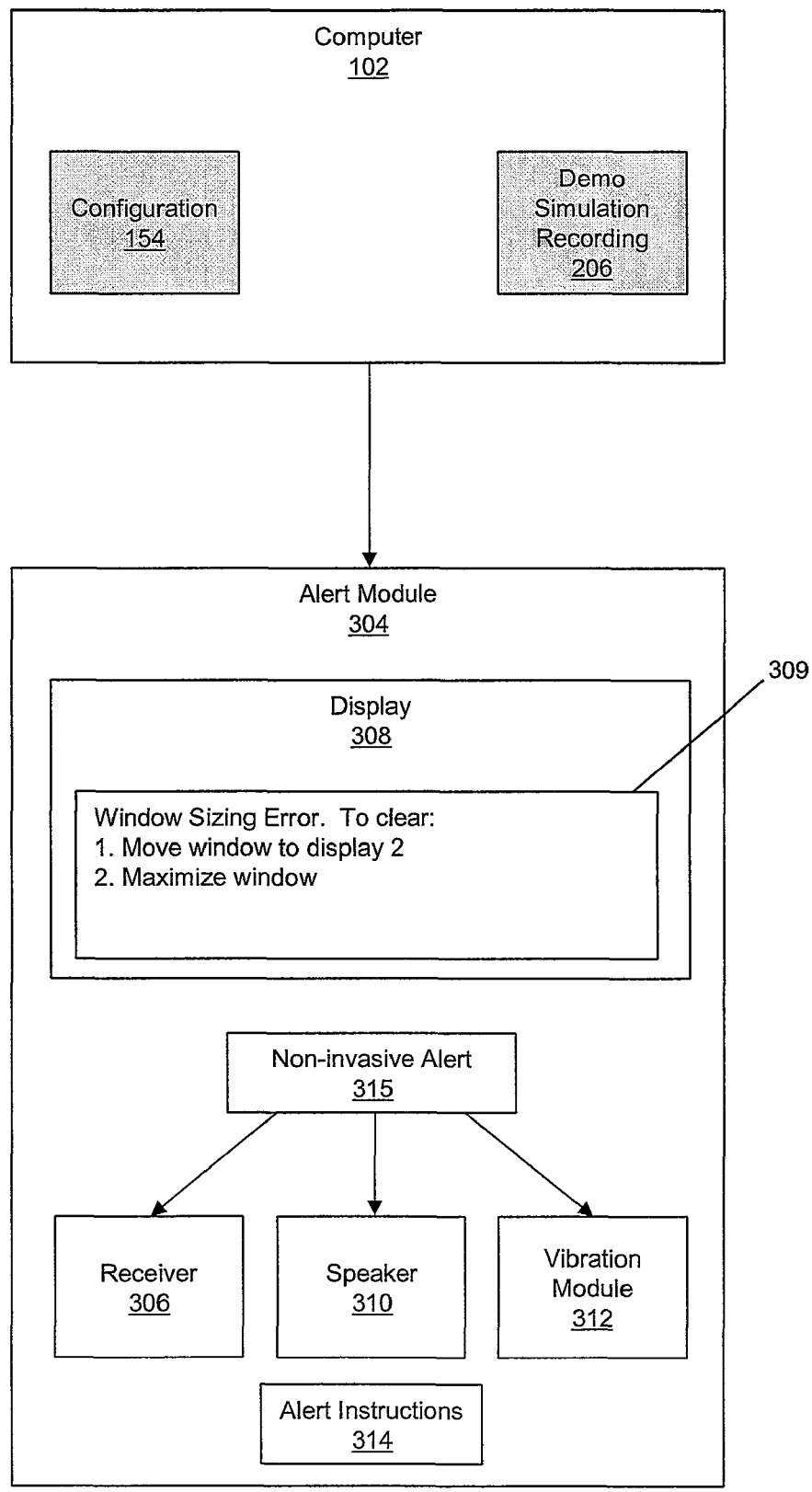
FIG. 3 is a diagram of an exemplary system for generating an alert at an alert module when a live demonstration deviates from actions of a recorded demonstration simulation, according to one embodiment.

With reference now to FIG. 3, there is illustrated an exemplary system for issuing a non-invasive alert to an alert module when a method of a live demonstration deviates from recorded actions of a recorded demonstration simulation, in accordance with another embodiment of the invention. In this embodiment alert instructions are transmitted to an alert module 306. The alert instructions 314 cause the alert module 304 to issue the non-invasive alert 315. Alert module 304 comprises a receiver 308 for receiving non-invasive alert 210 and one or more of display 308, speaker 310, and/or vibration module 312. Non-invasive alert 315 may be one or more of a vibration pulse alert, an audible alert, or a visual alert as described above. Additionally, alert module 304 may display a viewable correction description 309 on display 308. The correction description identifies a cause of the non-invasive alert and a series of steps that can be performed to clear the non-invasive alert.

Figure 4:
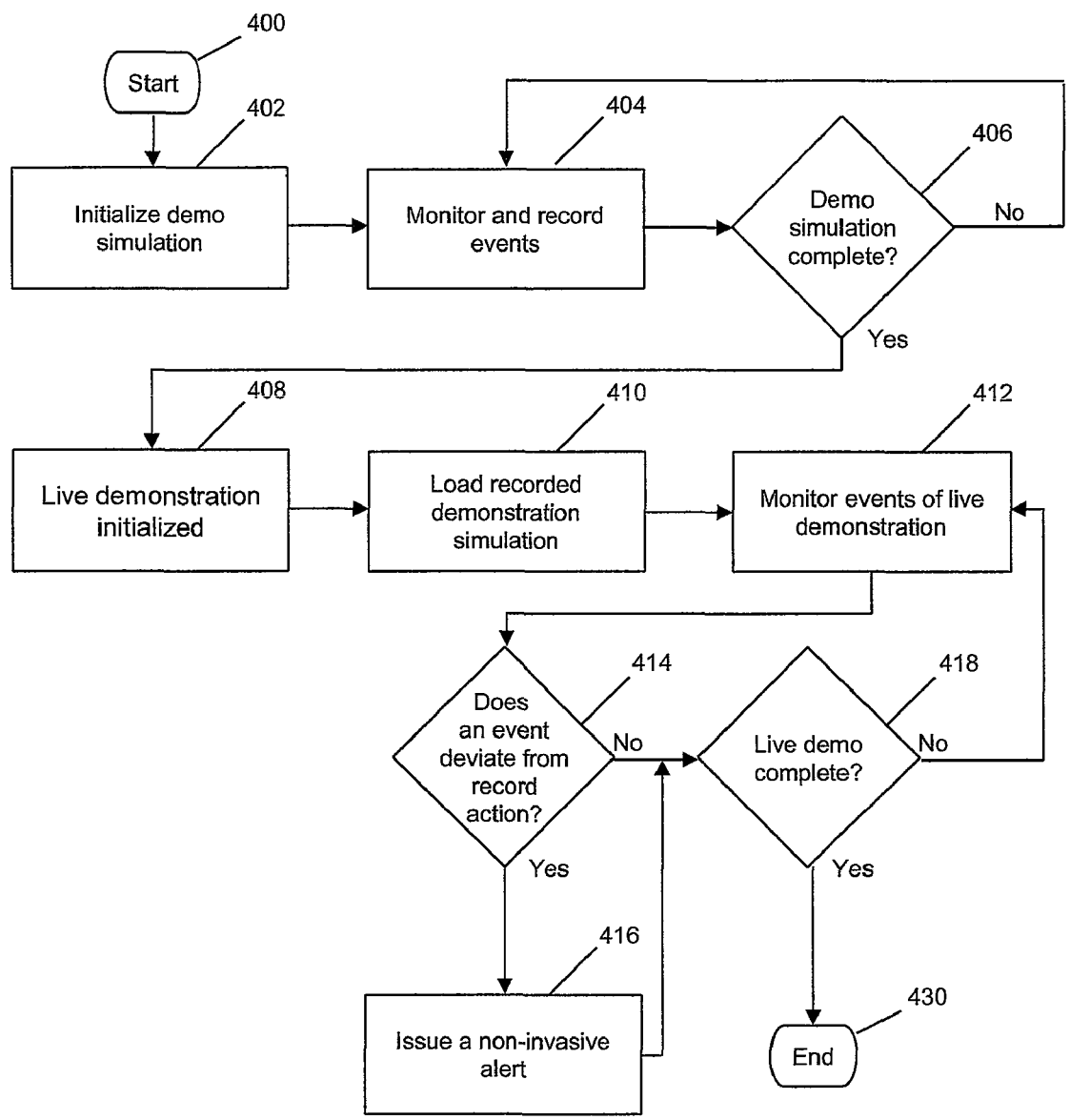
FIG. 4 is a high-level logical flowchart of an exemplary method for generating an alert when a live demonstration deviates from a recorded demonstration simulation, according to one embodiment.

With reference now to FIG. 4, there is provided a high-level flow chart of an exemplary method for alerting a user when a method of a live demo deviates from demo simulation actions. After initiator block 400, the demonstration simulation is initialized (block 402). The computer then monitors and records the order of occurrence of events of the demonstration simulation to a recorded demonstration simulation (block 404). At block 406 a determination is then made if the demonstration simulation is complete. If the demonstration simulation is not complete the process loops in an iterative fashion to block 404.

At block 408 a live demonstration is initialized. The computer then loads the recorded demonstration simulation corresponding to the live demonstration (block 410). Events of the live demonstration are then monitored and actively compared with events of the recorded demonstration simulation (block 412). At block 414 a determination is made if an event from the live demonstration deviates from the order and manner of events of the recorded demonstration simulation. If the live demonstration has deviated from the recorded demonstration simulation, a non-invasive alert is issued (block 416). At block 418 a determination is made if the live demonstration is complete. If the live demonstration is not complete, the process continues to block 412 in an iterative manner. When the live demonstration has completed the process ends at terminator block 430.

In the flow charts above, one or more of the methods are embodied such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Although aspects of the present invention have been described with respect to a computer processor and program application/logic, it should be understood that at least some aspects of the present invention may alternatively be implemented as a program product for use with a data storage system or computer system. Programs defining functions of the present invention can be delivered to a data storage system or computer system via a variety of data storage media, which include, without limitation, non-writable storage media (e.g. CD-ROM), and writable storage media (e.g. network attached storages, hard disk drive, read/write CD-ROM, optical media). It should be understood, therefore, that such data storage media, when storing computer readable instructions that direct method functions of the present invention, represent alternative embodiments of the present invention. Further, it is understood that the present invention may be implemented by a system having means in the form of hardware, software, or a combination of software and hardware as described herein or their equivalent. Additionally, the present invention may be implemented in a machine in the form of a computer-readable storage medium having a plurality of instructions embodied executing on a processing device.

Having thus described the invention of the present application in detail and by reference to illustrative embodiments thereof, it will be apparent that modifications and variations are possible without departing from the scope of the invention defined in the appended claims. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for issuing an alert during a live demonstration, the method comprising the steps of:

a computer
loading a recorded demonstration, the recorded demonstration comprising a chronological order of events performed during a recording of the recorded demonstration;

the computer monitoring an order of one or more events performed during the live demonstration; and the computer determining that an event of the one or more events performed during the live demonstration was performed in an order that deviates from the chronological order of the recorded demonstration, and in response, the computer issuing or causing an issuance of the alert such that the alert is perceptible by a user of the computer and not by an audience of the live demonstration.

2. The method of claim 1, further comprising the steps of, before the loading step:

the computer initializing a demonstration simulation;

the computer monitoring a sequence of events occurring in a chronological order during the the demonstration simulation;

after the demonstration simulation terminates, the computer recording the chronological order of the monitored sequence of events to form the recorded demonstration.

3. The method of claim 1, wherein the alert comprises one or more of:

a tactile pulse alert, an audible alert, and a visual alert comprising at least one of:

an on-screen indicator on a display, an alert window on a display, and a text message on a display.

4. The method of Claim 1, wherein the method comprises the step of the computer causing the issuance of the alert, and wherein the step of the computer causing the issuance of the alert comprises the step of the computer transmitting instructions to one or more of:
- flash an indicator;
- display a description of the alert;
- display an identification of a cause of the alert and a series of steps that can be performed to clear the alert;
- issue a vibration pulse; and
- play an audible notification.

5. The method of claim 1, further comprising:
- the computer determining whether a cause of the alert is resolved; and
- in response to the computer determining that the alert is resolved, the computer terminating the alert.

6. A system for issuing an alert during a live demonstration, the system comprising:
- a processor;
- a computer readable tangible storage device;
- computer readable instructions, stored on the storage device for execution by the processor, to load a recorded demonstration, the recorded demonstration comprising a chronological order of events performed during a recording of the recorded demonstration;
- computer readable instructions, stored on the storage device for execution by the processor, to monitor an order of one or more events performed during the live demonstration; and
- computer readable instructions, stored on the storage device for execution by the processor, to determine that an event of the one or more events performed during the live demonstration was performed in an order that deviates from the chronological order of the recorded demonstration, and in response, to issue or cause an issuance of the alert such that the alert is perceptible by a user of the computer system and not by an audience of the live demonstration.

7. The system of claim 6, further comprising computer readable instructions, stored on the storage device for execution by the processor, to, before loading the recorded demonstration:
- initialize a demonstration simulation; and
- monitor a sequence of events occurring in a chronological order during the demonstration simulation; and
- after the demonstration simulation terminates, record the chronological order of the monitored sequence of events to form the recorded demonstration.

8. The system of claim 6, wherein the comprises one or more of:
- a vibration pulse alert,
- an audible alert, and
- a visual alert, the visual alert further comprising at least one of:
  - an on-screen indicator on a display,
  - an alert window on a display, and
  - a text message on a display.

9. The system of claim 6, wherein the computer readable program instructions to issue or cause the issuance of the alert comprise computer readable program instructions to cause the issuance of the alert, and wherein the computer readable instructions to cause the issuance of the alert comprise computer readable instructions to transmit instructions to one or more of:
- flash an indicator;
- display a description of the alert;
- display an identification of a cause of the alert and a series of steps that can be performed to clear the alert;
- issue a vibration pulse; and
- play an audible notification.

10. The system of claim 6, further comprising:
- computer readable instructions, stored on the storage device for execution by the processor, to determine whether a cause of the alert is resolved; and
- computer readable instructions, stored on the storage device for execution by the processor, to in response to determining that the alert is resolved, terminate the alert.

11. A computer program product for issuing an alert during a live demonstration, the computer program product comprising:
- a computer readable tangible storage device;
- computer readable instructions, stored on the storage device, to load a recorded demonstration, the recorded demonstration comprising a chronological order of events performed during a recording of the recorded demonstration;
- computer readable instructions, stored on the storage device, to monitor an order of one or more events performed during the live demonstration; and
- computer readable instructions, stored on the storage device, to determine that an event of the one or more events performed during the live demonstration was performed in an order that deviates from the chronological order of the recorded demonstration, and in response, to issue or cause an issuance of the alert such that the alert is perceptible by a user of a computer used for the live demonstration and is not perceptible by an audience of the live demonstration.

12. The computer program product of claim 11, further comprising computer readable instructions, stored on the storage device, to, before loading the recorded demonstration:
- initialize a demonstration simulation;
- monitor a sequence of events occurring in a chronological order during the demonstration simulation; and
- after the demonstration simulation terminates, record the chronological order of the monitored sequence of events to form the recorded demonstration.

13. The computer program product of claim 11, wherein the alert comprises one or more of:
- a vibration pulse alert,
- an audible alert, and
- a visual alert, the visual alert further comprising at least one of:
  - an on-screen indicator on a display,
  - an alert window on a display, and
  - a text message on a display.

14. The computer program product of claim 11, wherein the computer readable instructions to issue or cause the issuance of the alert comprise computer readable instructions to cause the issuance of the alert, and wherein the computer readable instructions to cause the issuance of the alert comprise computer readable instructions to transmit instructions to one or more of:
- flash an indicator;
- display a description of the alert;
- display an identification of a cause of the alert and a series of steps that can be performed to clear the alert;
- issue a vibration pulse; and
- play an audible notification.

15. The computer program product of claim 11, further comprising:
- computer readable instructions, stored on the storage device, to determine whether a cause of the alert is resolved; and
- computer readable instructions, stored on the storage device, to, in response to determining that the alert is been resolved, terminate the alert.

16. The method of claim 2, wherein the recording step comprises recording a context of each event in the monitored sequence of events.

17. The system of claim 7, wherein the computer readable instructions to record the chronological order of the monitored sequence of events comprise computer readable instructions to record a context of each event in the monitored sequence of events.

18. The computer program product of claim 12, wherein the computer readable instructions to record the chronological order of the monitored sequence of events comprise computer readable instructions to record a context of each event in the monitored sequence of events.

* * * * *